W. J. VAN PATTEN.
Milk-Faucet.
No. 226,213. Patented April 6, 1880.
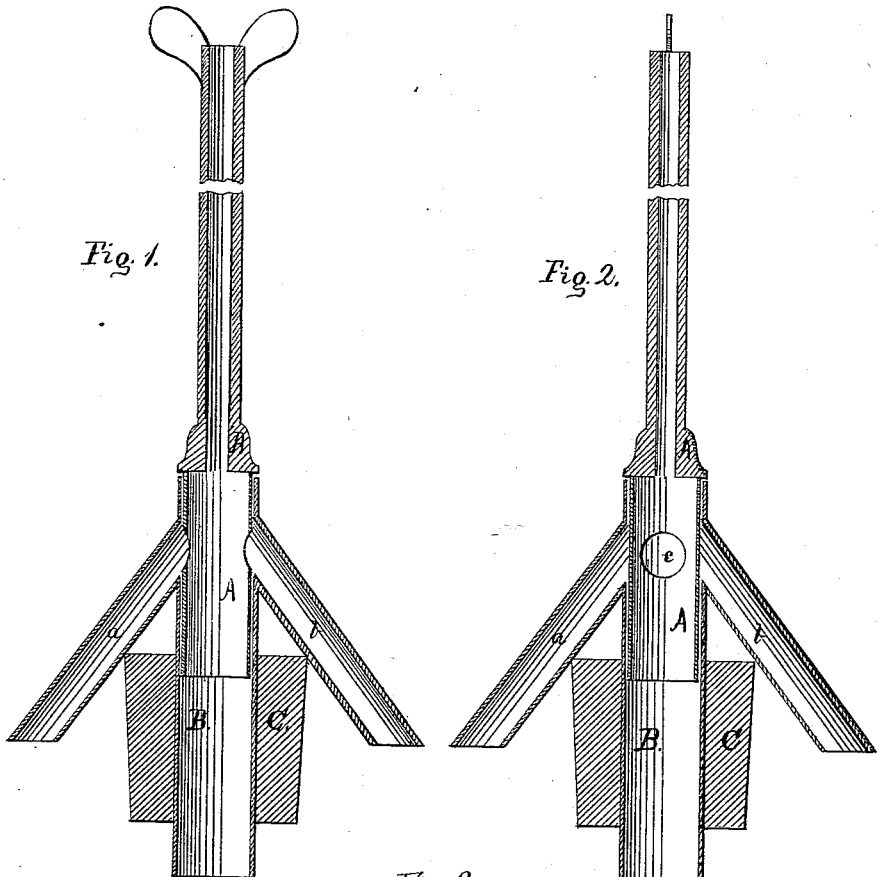
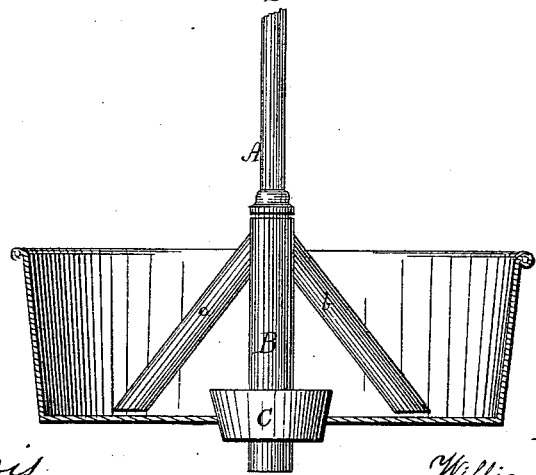
Witnesses:
James Lewis
Chas. F. Lewis
Inventor:
William J. Van Patten,
per Charles E. Allen,
Attorney.

UNITED STATES PATENT OFFICE.

WILLIAM J. VAN PATTEN, OF BURLINGTON, VERMONT.

MILK-FAUCET.

SPECIFICATION forming part of Letters Patent No. 226,213, dated April 6, 1880.

Application filed December 5, 1879.

*To all whom it may concern:*

Be it known that I, WILLIAM J. VAN PATTEN, of the city of Burlington, in the county of Chittenden and State of Vermont, have invented certain new and useful Improvements in Milk-Faucets; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to a device whereby any desired quantity of milk can be drawn from the bottom of a pan or vessel without disturbing the cream.

During the first twelve hours of the milk-setting under a temperature best calculated to facilitate the raising of the cream it is found that the cream is raised to within one inch of the top of the milk. An inch or less in depth of milk to sustain the cream is then all that is required to ripen or mature it.

To draw off any portion of the milk while sweet for the use of stock, cheese, &c., without disturbing by currents or otherwise the cream is the object of my invention.

In the accompanying drawings, in which similar letters of reference indicate like parts, Figure 1 is a perspective of a device embodying my invention. Fig. 2 is a vertical section of the same. Fig. 3 is a view of the faucet in position in a pan.

A is a cylindrical handle, the lower extremity of which fits perfectly the interior of the lower cylinder or pipe, B. From either side, and near the top of this cylinder or pipe B, short hollow tubes or arms $a$ and $b$, communicating directly with the interior of the cylinder or pipe B, project outward and downward.

Perforations are made on either side of the handle A to correspond with the openings into the cylinder B of the arms $a$ and $b$ when the handle is inserted into the pipe B as far as the shoulder $e$ will admit.

C is a cork or plug, through the center of which a hole is made sufficiently large to admit the insertion of the pipe B.

The operation of the device is as follows:

A hole is made through the bottom of the milk pan or vessel, into which the cork C is fitted. The cylinder or pipe B is then passed through the cork, care being taken that the distance between the upper extremity of the hollow arms $a$ and $b$ and the bottom of the milk-vessel shall be equal to the thickness of the cream and the depth of the milk which it is desired to have remain beneath the cream.

The handle A should be of sufficient length to be easily operated without disturbing the cream.

To draw off the milk, turn the handle A until the holes $c$ are opposite the openings into the arms $a$ and $b$. The atmospheric pressure upon the surface of the cream is sufficient to start the flow at once, as there is no pressure within to be overcome. The handle A is made hollow throughout to prevent its acting as a siphon.

The object of the two arms $a$ and $b$, located as described, is to obtain a greater flow without creating a current in the milk, as the streams act upon each other as they flow through the holes $c$ from opposite sides of the pipe B, and thence down and out of the pipe B into the vessel below.

The flow can be still further controlled by slightly turning the handle A in either direction, thus modifying the size of the apertures $c$.

To stop the flow entirely, turn the handle until the apertures $c$ do not open into the arms $a$ and $b$.

By providing the pipe B with only one arm or inlet and turning its lower extremity at right angles my device is readily adapted for use in milk cans or pails for drawing off the milk for family use.

What I claim is—

1. The delivery-pipe provided with one or more hollow arms or branches extending downward from its upper extremity, arranged and operated substantially as described.

2. The improved automatic milk-faucet consisting of a pipe having one or more hollow arms or inlets, in combination with a cylindrical handle with one or more perforations corresponding with and adapted to said inlet, substantially as described.

3. In an automatic milk-faucet, the adjustable handle A, consisting of a cylindrical section with apertures in its lower extremity sliding inside of a delivery-pipe having corresponding hollow arms or inlets, in combination with the perforated cork or plug C, substantially as set forth.

In testimony that I claim the foregoing as my own I do affix my signature in presence of two witnesses.

WILLIAM J. VAN PATTEN.

Witnesses:
CHARLES E. ALLEN,
A. G. RICHARDSON.